Figure 1:
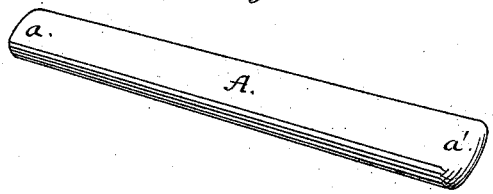

(No Model.)

S. E. JERALDS & E. R. LAWTON.
MANUFACTURE OF CUTLERY HANDLES.

No. 295,016. Patented Mar. 11, 1884.

Attest:
F. J. Chapman
George Tilghman

Inventor:
Silas E. Jeralds
and Edwin R. Lawton
by W. H. Babcock
Attorney

UNITED STATES PATENT OFFICE.

SILAS E. JERALDS AND EDWIN R. LAWTON, OF WEST CHESHIRE, CONN.

MANUFACTURE OF CUTLERY-HANDLES.

SPECIFICATION forming part of Letters Patent No. 295,016, dated March 11, 1884.

Application filed March 26, 1883. (No model.)

*To all whom it may concern:*

Be it known that we, SILAS E. JERALDS and EDWIN R. LAWTON, residing at West Cheshire, in the county of New Haven and State of Connecticut, have invented certain new and useful Improvements in the Manufacture of Handles for Cutlery or other Articles, of which the following is a specification, reference being had to the accompanying drawings, and to letters or figures of reference marked thereon, which form a part of this specification.

Our invention relates more particularly to handles for table-cutlery; and it consists, chiefly, in a hollow metallic shell having its outer end closed, and formed by the compression inward edge to edge of such irregular terminal portion of said shell as may produce the desired shape of the handle, and having its meeting edges brazed or soldered together to unite and fill the joint.

It also consists in the process of manufacture hereinafter described and claimed.

Heretofore hollow knife-handles of wrought metal have generally been formed by "drawing up" a sheet or plate into a straight, unseamed shell; or by using a straight, flattened tube, either with a seam longitudinally through one of its sides or with its body seamless, and closing its outer end with a plug or plate; or by striking up two longitudinal halves and soldering them together edge to edge. The method first above referred to is not adapted to the manufacture of tapered handles, in which the outer or butt end is the largest, and which are generally preferred because the tool cannot be withdrawn unless of very peculiar and costly construction. The second method above named produces a handle with a very insecure end, and is likewise open to the objections pertaining to the first method. The third method above named produces a handle which has a seam all around it longitudinally, and is necessarily weakened thereby and rendered liable to separation, and is of very difficult, delicate, and costly construction. A hollow handle with a single seam and welded to the blade has been made; but its butt is not formed of terminal portions or lips turned edge to edge and brazed. Ferrules for pitchfork-handles have been made having a single longitudinal seam and terminal lips; but these lips are not turned edge to edge. They have an open space between them, and cannot be brought together without distorting or mutilating the end of the handle.

The advantages of our invention are: the production of a hollow handle without longitudinal seam, and either untapered or having a regular or irregular tapering form, from one piece of metal; the perfect uniformity of its exterior surface, thereby reducing the requisite grinding and polishing to a minimum; the greater security of its joint; an increased strength for the purpose of its union with the tang of the blade; the decreased extent of seam, and thereby lessened possibilities of imperfections in the union of its edges, whereby the perfection of a plated surface would be disturbed; the combination of lightness of weight with convenience of form, symmetry of proportion, and the absence of side seams, thereby uniting the advantages of solid and of hollow handles, while avoiding the defects of both.

Figure 2:
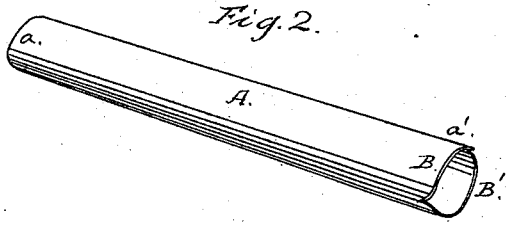
Figure 3:
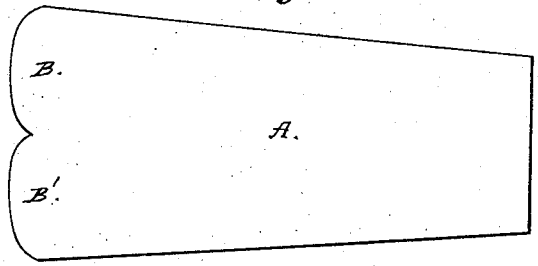
Figure 4:
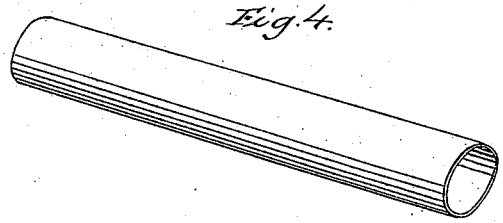
Figure 5:
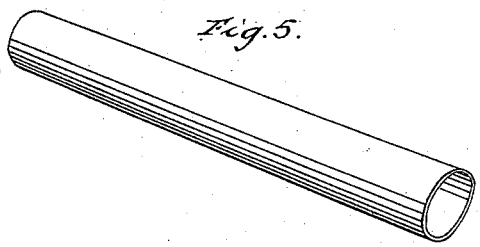

In the accompanying drawings, Figure 1 represents a perspective view of one of my hollow metallic handles. Fig. 2 represents a similar view of the same before the lips are turned in to form the butt. Fig. 3 represents a plan view of a metallic blank adapted to be bent into the shape of Fig. 2. Fig. 4 represents a cylindrical tube adapted to be expanded or compressed into tapering form, and closed at the butt to form a handle like Fig. 2; and Fig. 5 represents a tube like that shown in Fig. 4 after it has been given the flattened and tapering form, but before closing the butt.

A designates the body of the handle, having a small end, *a*, to which the tang of the blade is attached, and a large end, *a'*.

B B' designate the two lips which form the butt or other end of the handle.

We may adopt any one of several methods of manufacturing our butt. For example, we sometimes first stamp out a blank such as that shown in Fig. 3. We then bend it over edge to edge into the form of a tapering tube, and braze or solder the edges. We then flatten the tube so as to give it the shape of an ordinary knife-handle. We then bend over the lips B B' edge to edge and solder them, thus closing the butt and completing the article. As an alternative method, we may take an ordinary piece of brass or other metallic tubing, either seamed or unseamed, and give it, either by contraction, expansion, or both, a tapering form, such as is shown in Fig. 5. We then flatten it into knife-handle shape and cut out the ends of the ellipse, so as to leave lips B B' at the sides, as in Fig. 2. We then bend over said lips edge to edge and solder them to complete the butt. The first of our methods above described will be used chiefly with cheap goods, which will be made of iron, and could not be so easily expanded or contracted as brass or German silver. The second method will be chiefly employed for the latter and more ductile metals, and for more expensive goods. We are able to make a handle of any desired taper, either regular or irregular. The tool or mandrel which is used for expanding the shell into the tapering form is withdrawn through the large end $a'$ of said shell before the sides thereof are flattened. Instead of expanding the shell, it may be placed upon a mandrel which tapers to a smaller diameter than said shell, and compressed or hammered into shape. A still better plan is to partly expand the shell by the action of the tool, and then compress the shell thereon, thus uniting both compression and expansion in the process. In either of these handles so produced the terminal portion may not be confined to any specified number or location or shape or size of projections or lips, such number and location being employed as may best be adapted to produce the required shape. Preferably we employ two; but a single lip will suffice.

Ordinarily we should employ either of the above-described methods of producing the body of the handle A, according to the quality and character of the handle required; yet obviously other methods may be employed to produce such body of the handle A, all, however, requiring the terminal projection of sufficient metal as may be necessary to permit of the suitable closing of its end.

Any process hereinbefore described but not claimed, or which may be used as a substitute for the process herein claimed for manufacturing our improved handle, may form the subject-matter of a separate application.

Having thus described our invention, what we claim as new, and desire to secure by Letters Patent, is—

1. A tubular blank for a hollow handle, having at one end a projecting lip or lips adapted to be bent edge to edge and united to form the butt or outer end of the handle.

2. The method of making a handle for cutlery or other articles, consisting in introducing a tapering tool into a tube and giving to the latter, either by contraction or expansion, a tapering shape, withdrawing said tool through the large end of the tapering tube thus formed, then flattening said tube into the shape of a knife-handle and cutting out the large end thereof sufficiently to leave a lip or lips integral with the sides and adapted to close the said end, then bending the said lip or lips edge to edge and soldering the edges together for the purpose of completing the handle, substantially as set forth.

3. As an improvement in the manufacture of handles for cutlery and other articles, the method of cutting out the large end of a metallic shell sufficiently to leave a lip or lips integral with the sides and adapted to close the said end, then bending the said lip or lips edge to edge and soldering or brazing the edges together.

4. As an improvement in the manufacture of handles for cutlery and other articles, the method of constructing a metallic shell having at its outer end one or more lips or projections integral therewith, and adapted to be bent inward and close and form the outer end of the handle, then bending said lip or lips edge to edge and brazing or soldering the edges together.

In testimony whereof we affix our signatures in presence of two witnesses.

SILAS E. JERALDS.
    EDWIN R. LAWTON.

Witnesses:
 WM. H. BABCOCK,
 GEORGE TILGHMAN.